US007588214B2

(12) United States Patent
Watt et al.

(10) Patent No.: US 7,588,214 B2
(45) Date of Patent: Sep. 15, 2009

(54) DEPLOYABLE SUPPORT STRUCTURE

(75) Inventors: Alan M Watt, Essex (GB); Sergio Pellegrino, Cambridge (GB); Phillip A. S. Howard, Portsmouth (GB)

(73) Assignees: Astrium Limited, Hertfordshire (GB); Cambridge University Technical Services, Cambridge (GB)

( * ) Notice: Subject to any disclaimer, the term of this patent is extended or adjusted under 35 U.S.C. 154(b) by 515 days.

(21) Appl. No.: 10/504,594

(22) PCT Filed: Jul. 15, 2004

(86) PCT No.: PCT/GB2004/003071

§ 371 (c)(1),
(2), (4) Date: Aug. 16, 2004

(87) PCT Pub. No.: WO2005/011056

PCT Pub. Date: Feb. 3, 2005

(65) Prior Publication Data

US 2005/0230561 A1 Oct. 20, 2005

(30) Foreign Application Priority Data

| | | |
|---|---|---|
| Jul. 17, 2003 | (EP) | 03254474 |
| Jul. 17, 2003 | (GB) | 0316734.3 |
| Dec. 24, 2003 | (GB) | 0330015.9 |

(51) Int. Cl.
*B64C 9/00* (2006.01)

(52) U.S. Cl. ........................ 244/217; 343/881; 343/915; 52/573.1; 135/126; 135/128; 160/88; 206/736; 211/195

(58) Field of Classification Search .............. 244/172.6, 244/172.7, 172.8, 217; 52/573.1; 135/126, 135/128; 160/88; 343/915, 880, 881; 206/736; 211/195
See application file for complete search history.

(56) References Cited

U.S. PATENT DOCUMENTS

| | | | | |
|---|---|---|---|---|
| 5,239,739 | A | 8/1993 | Akeel et al. | |
| 5,239,793 | A | 8/1993 | Chiappetta et al. | |
| 5,520,747 | A | 5/1996 | Marks | |
| 5,909,860 | A | 6/1999 | Lee | |
| 6,209,557 | B1 * | 4/2001 | Zheng | 135/126 |

(Continued)

FOREIGN PATENT DOCUMENTS

EP 0 926 068 A1 6/1999

(Continued)

OTHER PUBLICATIONS

EP Examination letter dated Jan. 23, 2008 for EP 04 743 412.2.

*Primary Examiner*—J. Woodrow Eldred
(74) *Attorney, Agent, or Firm*—Nixon & Vanderhye P.C.

(57) ABSTRACT

A support structure (1) is provided comprising a plurality of curved surfaces A, B hingedly interconnected along their edges such as to provide effective deployment in two separate stages. Preferably, the structure has only two curved surfaces hingedly interconnected at a single non-planar hinge line. In FIG. 1(*a*), the two sheets A, B are coplanar in that they lie in the same horizontal plane, permitting the structure to be in a flat, first stage deployment position. In Figure (b), the structure is fully deployed in a second stage deployment position by bringing sheet A out of plane through some angle in relation to the position of sheet B, resulting in both sheets becoming curved. The structure has utility in various space-based as well as terrestrial reflective and absorbing applications, and bears definite advantage in terms of weight saving, high stiffness and well-defined surface precision.

19 Claims, 10 Drawing Sheets

U.S. PATENT DOCUMENTS

| | | | | |
|---|---|---|---|---|
| 6,624,796 | B1 * | 9/2003 | Talley et al. | 343/915 |
| 2003/0182879 | A1 | 10/2003 | Warren | |

FOREIGN PATENT DOCUMENTS

| | | |
|---|---|---|
| EP | 1 168 498 A2 | 1/2002 |
| GB | 127067 | 2/1919 |
| GB | 796271 | 6/1958 |
| JP | 2-45300 | 2/1990 |
| JP | 10-51215 | 2/1998 |
| WO | WO 97/07037 | 2/1997 |

* cited by examiner

DEPLOYABLE SUPPORT STRUCTURE

This application is the US national phase of international application PCT/GB04/03071 filed 15 Jul. 2004, which designated the US and claims priority to GB Application No. 0316734.3, filed 17 Jul. 2003 and EP Application No. 03254474.4, filed 17 Jul. 2003 and GB Application No. 0330015.9 filed 24 Dec. 2003. The entire contents of these applications are incorporated herein by reference.

FIELD OF THE INVENTION

The present invention concerns improvements relating to a deployable support structure. More particularly, but not exclusively, the present invention concerns improvements relating to a two-stage deployable reflector support structure which has utility in various space-based and terrestrial applications.

BACKGROUND OF THE INVENTION

Prior to this inventive study, the applicant performed system tradeoff studies for satellite structures carrying Earth observation radar equipment suitable for launch, for example in the Rockot launch vehicle (Howard, 2001). Possible design options for the radar included an unfurlable reflector (mesh or inflatable), a two axis hinged reflector, and a single axis hinged reflector. The first two options were rejected because the unfurlable reflector option was found to be expensive and the two-axis hinged reflector option was complicated and unnecessary. A single-axis hinged reflector was then selected by the applicant as the baseline. The configuration/accommodation of the reflector included a centre-fed reflector, a dual reflector (main reflector/sub reflector), and an offset reflector. The centre-fed reflector had a main reflector with deployable wings centrally fed from a deployable linear feed array. Although this option offered the simplest mechanical design and compact solution, it was rejected due to a major concern of the need for the radio frequency (RF) power to be transferred via the deployment hinges to the feed array. The dual reflector design had a fixed linear feed array, but had a deployable subreflector. This option was also rejected due to the unwanted RF losses coming from the blockage. The offset reflector design had a fixed linear feed array, no RF power carrying element to deploy, no subreflector, no blockage, and it needed to be folded during launch. The offset reflector was subsequently selected as baseline by the applicant.

OBJECTS AND SUMMARY OF THE INVENTION

The present invention aims to overcome or at least substantially reduce some of the above mentioned problems associated with known designs.

It is the principal object of the present invention to provide a two-stage deployable support structure which finds utility in low-cost space missions and which bears definite structural advantage in terms of weight saving, high stiffness and well-defined surface precision.

In broad terms, the present invention resides in the concept of providing a well-defined support structure with a number of curved surfaces hingedly interconnected along their edges such as to be capable of effective deployment in two separate stages.

More particularly, according to a first aspect of the present invention there is provided a two-stage deployable support structure comprising: a plurality of interconnected curved surfaces; means defining a number of hinge lines along which said surfaces are interconnected; said surfaces being adapted and arranged to provide a package of predetermined shape and size; said package being deployable by means of a first unfolding operation of the surfaces to form a substantially flat structure; and said substantially flat structure being further deployable by means of a second unfolding operation of the surfaces to form a well-defined structure, for example a hollow solid structure.

Further, according to a second aspect of the present invention there is provided a two-stage deployable support structure comprising: a plurality of interconnected curved surfaces; means defining a number of hinge lines along which said surfaces are interconnected; said surfaces being movable between a first stowed position, in which the surfaces provide a package of predetermined shape and size, and a first deployed position in which the surfaces are in substantially flat condition, and said surfaces being further movable between said first deployed position and a second deployed position in which the surfaces form a well defined structure, for example a hollow solid structure.

In accordance with an exemplary embodiment of the invention which will be described hereinafter in detail, there are only two curved surfaces interconnected at a single non-planar hinge line. Alternatively, in accordance with another embodiment of the invention which will also be described hereinafter, there are four curved surfaces linked in a closed configuration and six hinge lines associated therewith, two of the surfaces being concave-shaped opposing surfaces and the other two surfaces being convex-shaped opposing surfaces.

Preferably, one of the curved surfaces is configured to provide a reflective surface. The reflective surface conveniently has a parabolic shape, although other kinds of reflector shape could possibly be used instead to achieve the same reflective function.

Advantageously, the first stage of deployment of the structure involves the surfaces unfolding from a predetermined rolled, folded/coiled or Z-type folded configuration.

Advantageously, the second stage of deployment involves the unfolding of the structure in substantially flat condition to form a well defined structure for the purposes of deployment; a hollow solid structure suitable for deployment could be formed in this way for example.

Conveniently, the deployment process may be powered by the provision of elastic strain energy hinges, tape spring hinges for example, on some or all of the hinge lines of the structure. Additional locking mechanisms may also be used to latch the structure into the deployed position, if desired.

Advantageously, the structure in deployed condition has high stiffness; for example, in one embodiment this results from the structure having a thin-walled box type cross-section.

Advantageously, the surfaces of the structure are suitably curved to bolster the overall strength of the structure by means of decreasing the local buckling. Note that the particular curvature of the surfaces is suitably determined by the shape of the hinge line connecting the surfaces. It is also to be appreciated that the strength of the structure can be further improved, if desired, by making some of the surfaces doubly curved.

Conveniently, the deployable support structure is formed of lightweight composites material, carbon-fibre composite material for example.

Accordingly to another aspect of the present invention there is provided a method of deploying a support structure in two stages comprising the steps of: (a) providing a package of predetermined shape and size in stowed condition, which package comprises a plurality of interconnected curved surfaces with means defining a number of hinge lines along which the surfaces are interconnected; (b) unfolding the surfaces of the package so as to form a substantially flat structure for first stage deployment; and (c) unfolding the surfaces of the substantially flat structure so as to form a well-defined structure for second stage deployment.

Further, the present invention extends to a reflector system for space-based applications incorporating the deployable support structure described hereinabove. Such a system could conveniently comprise three functional elements, namely a launch restraint system, a support structure and a deployable reflector. It is also envisaged that such a system could be designed for supporting low-cost space missions employing small platforms and supporting either L or P band SAR (Synthetic Aperture Radar) payload.

Further, the present invention extends to an antenna structure incorporating the above described deployable support structure.

The present invention also extends to spacecraft and to synthetic aperture radar (SAR) satellite systems incorporating the reflector system described hereinabove. In one possible application for example, one of the curved surfaces could be used to form the reflective surface of the synthetic aperture radar (SAR).

It is to be appreciated that the deployable support structure has a simplified, mechanically robust design and can be easily implemented at reasonable cost in various space-based applications, for example in reflecting applications as well as in absorbing applications. The support structure could also be possibly used for terrestrial/other applications, MEMS fabrication for example, this being made possible when the surfaces of the structure are formed of thin sheet material of typically micron-size thickness.

The above and further features of the invention are set forth with particularity in the appended claims and will be described hereinafter with reference to the accompanying drawings.

DETAILED DESCRIPTION OF EXEMPLARY EMBODIMENTS

Figure 1A:
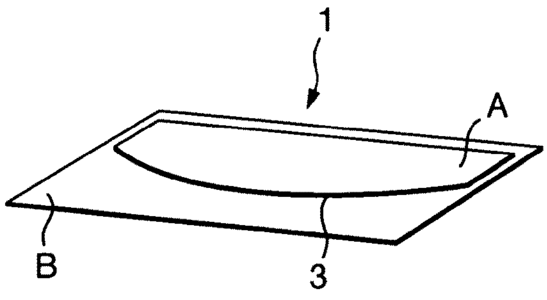
FIG. 1 is a schematic view of a support structure embodying the present invention, FIG. 1(*a*) showing the structure in flat condition (stage one of the deployment process) and FIG. 1(*b*) showing the structure in deployed condition (stage two of the deployment process)
Figure 1B:
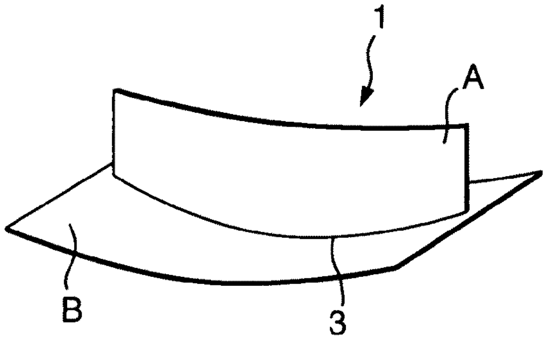

Referring first to FIG. 1, there is schematically shown therein a preferred deployable support structure 1 embodying the present invention. The support structure 1, generally indicated in solid line in a flat, first stage deployment condition in FIG. 1(*a*) and in a second stage deployment condition in FIG. 1(*b*), comprises two surfaces formed of sheet material A, B which are hingedly interconnected to each other along a non-straight hinge line/edge 3. In FIG. 1(*a*), the two sheets A, B are made to be coplanar in that they lie in the same horizontal plane, permitting the structure 1 to be in flat deployed condition. In FIG. 1(*b*), the structure 1 can be fully deployed by controllably bringing sheet A out of plane through some angle in relation to the position of sheet B shown in FIG. 1(*a*), for example by rotating sheet A through 90°, which results in both sheets A, B becoming curved. Conveniently, as shown in the Figure, by suitably shaping the edge 3 of sheet A in a predetermined fashion, it is possible to make the interconnecting sheet B take any required singly-curved shape. Conveniently, the sheets are made of woven carbon composite material.

Figure 2A:
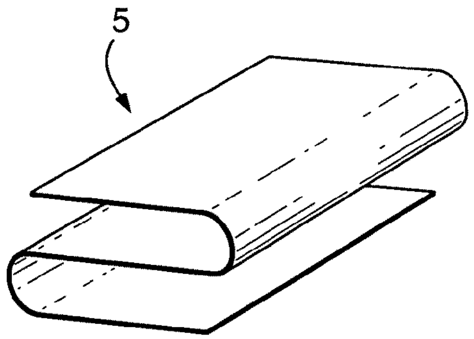
FIG. 2 is a schematic view of the support structure of FIG. 1, FIG. 2(*a*) showing the structure in a Z-type shape in stowed condition, and FIG. 2(*b*) showing the structure in a coil-type shape in stowed condition.
Figure 2B:
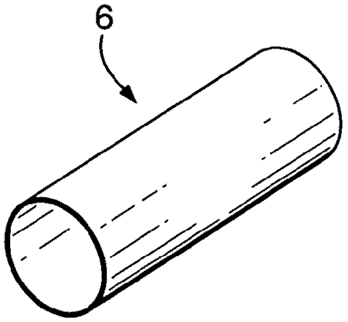

FIG. 2(*a*) shows how the structure of FIG. 1(*a*) can be effectively folded using a Z-type folding scheme to form a well-defined compact package 5. FIG. 2(*b*) shows how the structure of FIG. 1(*a*) can be alternatively folded, if required, using a coiled-type folding scheme to form a different-sized compact package 6. Thus, as shown in FIGS. 1 and 2, the structure can be effectively folded via a two stage folding process, whereby the first stage of the folding process involves flattening the structure of FIG. 1(*b*) to form the structure of FIG. 1(*a*), and the second stage of the folding process involves folding the structure of FIG. 1(*a*) to form a folded structure of the kind shown in FIG. 2. It is to be appreciated that different kinds of folding scheme can be used to effect the second stage of the folding process and that FIG. 2 shows, by way of example, two kinds of package 5, 6 resulting from the folding procedure.

It is to be understood that the two kinds of folded package in FIG. 2 have various advantages and disadvantages.

Z-Type

Requires more volume when stowed.

a Easy to control the deployment process.

Requires equal size slots or sidewalls.

The slots require to be positioned evenly.

Coil-Type

Requires volume when stowed.

Difficult to control the deployment process.

Requires different size slots for sidewalls.

The slots are not positioned evenly.

Figure 3A:
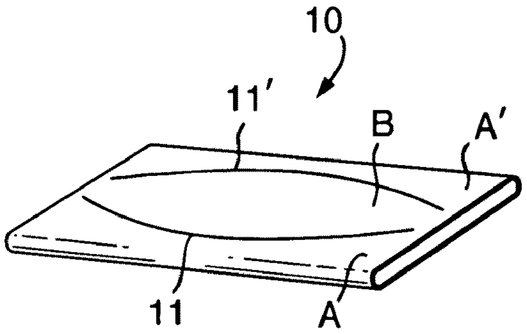
FIG. 3 is a schematic view of an exemplary embodiment of the present invention, FIG. 3(*a*) showing a hollow-solid support structure in substantially flat condition (stage one of the deployment process) and FIG. 3(*b*) showing the structure of FIG. 3(*a*) in fully deployed condition (stage two of the deployment process)
Figure 3B:
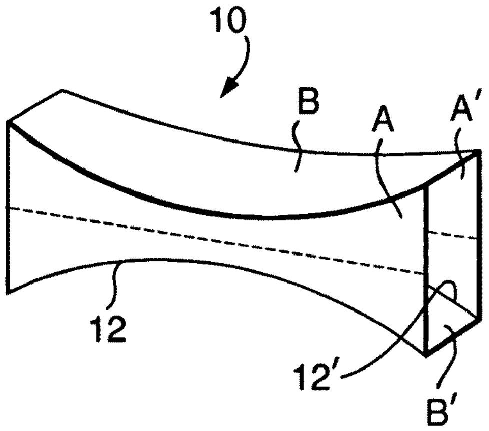

FIG. 3 schematically shows another preferred deployable support structure 10 embodying the present invention. The support structure 10, generally indicated in solid line in a flat, first stage deployment condition in FIG. 3(*a*) and in a second stage deployment condition in FIG. 3(*b*), comprises two interconnecting pairs of sheets A, A', B, B' which are attached to each other along the non-straight edges 11, 11', 12, 12', 12" of the structure. More particularly, as shown in FIG. 3(*a*), sheets A and A', which are identical, are connected to sheets B and B', which are also identical. The edge shape is made to be identical in all four sheets A, A', B, B'. The structure of FIG. 3(*a*) is conveniently obtained by introducing a fold about the broken lines (see FIG. 3(*b*)) along the centre lines of sheet A and A'. As shown in FIG. 3(*b*), the structure can be fully deployed to form a well-defined hollow-solid structure in which the four sheets A, A', B, B' form four connecting curved surfaces. In this described embodiment, the top and bottom curved surfaces B and B' are concave-shaped and the two sidewall curved surfaces A, A' are convex-shaped. Note that the four curved surfaces A, A', B, B' are hingedly interconnected to each other along six hinge lines. It is to be also appreciated that the hollow-solid structure of FIG. 3(*b*) can be effectively folded via a two stage folding process, whereby the first stage of the folding process involves substantially flattening the structure of FIG. 3(*b*) to form the structure of FIG. 3(*a*), and the second stage of the folding process involves folding the structure of FIG. 3(*a*) to form a folded structure of the kind shown in FIG. 2.

Conveniently, the sheets are made of woven carbon composite material. Conveniently, the curved sheets of the structure 10 may be connected together using woven glass tape (3M 79 Tape, white glass cloth with acrylic adhesive). The tape is typically subject to shear loading, and it can be applied at an angle if desired.

Conveniently, the structure 10 is manufactured in the following way. First, two sidewalls are successively connected to the top surface in flat position, and thereafter, another wall is added to the structure so as to close the structure. Tape springs, for example sheet tape springs, can be added to the sidewalls, if desired, to increase the overall structural stiffness and provides additional power to the deployment. Spaces may be required in the structure to separate the sheet material close to the edges with “cut-outs”, thereby reducing/preventing overstressing of the structure.

Advantageously, the sidewalls can be effectively connected to the top/bottom surface via T-hinged joint mechanisms (not shown). Reinforcement (rib) elements (not shown) may also be incorporated into the structure to reduce/prevent the local buckling of the walls. Spacing of the tape connections is typically reduced/minimised for uniform strength and stiffness.

As mentioned above, tape spring hinges may be conveniently used to power the deployment, and also increase the stiffness of the sidewalls. The number of tape springs and the distance between rivets used in the structure can be readily varied for optimisation purposes. Curved washers may be used to reduce/prevent flattening of the tape-springs, if desired. Bolts can be readily used in the structure as an alternative to rivets.

Slots may be required in the structure for 180° bending surfaces (sidewalls) because there are crossing hinge lines when folding the structure. The length and width of slots depends upon the particular folding type (see FIG. 2) and the particular material properties of the structure. The position of the slots can be readily adjusted according to the particular folding type of the structure.

Cross bracing wires and vertical stiffener elements (not shown) may be conveniently positioned at ends of the structure so as to stiffen the structure (i.e. reduce/prevent buckling) when deployed. Transverse stiffener elements could also be incorporated into the structure for reducing local structural buckling effects, if desired.

Additional locking elements (not shown) may also be incorporated into the structure to further latch the structure into deployed position, if required.

Figure 4:
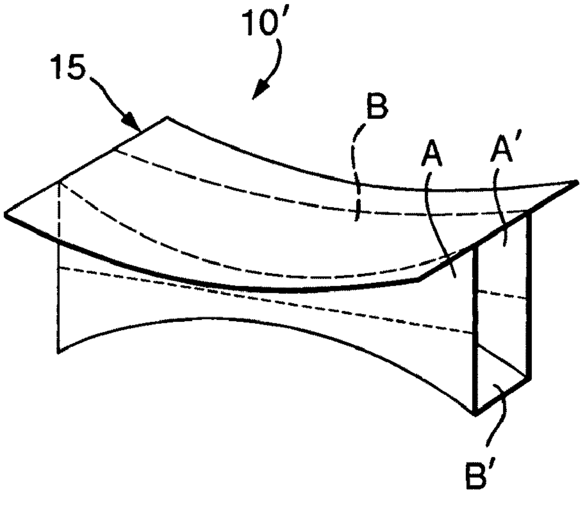
FIG. 4 is a schematic view of a preferred antenna structure embodying the present invention when in deployed configuration.

Advantageously, as shown in FIG. 4, a reflective (RF) surface 15 can be readily placed in lieu of the top sheet B of the FIG. 3 structure so as to provide an antenna reflector support structure 10' for deployment purposes. A reflective surface could alternatively, or even additionally, be placed in lieu of the bottom sheet B', if desired, though this is not a preferred option. As shown, the reflective surface 15 has a well-defined parabolic shape. It is to be understood, however, that other non-parabolic reflector shapes could be used instead in the antenna structure 10' if required. The antenna structure 10' of FIG. 4 can be folded in two stages as explained above.

Figure 5:
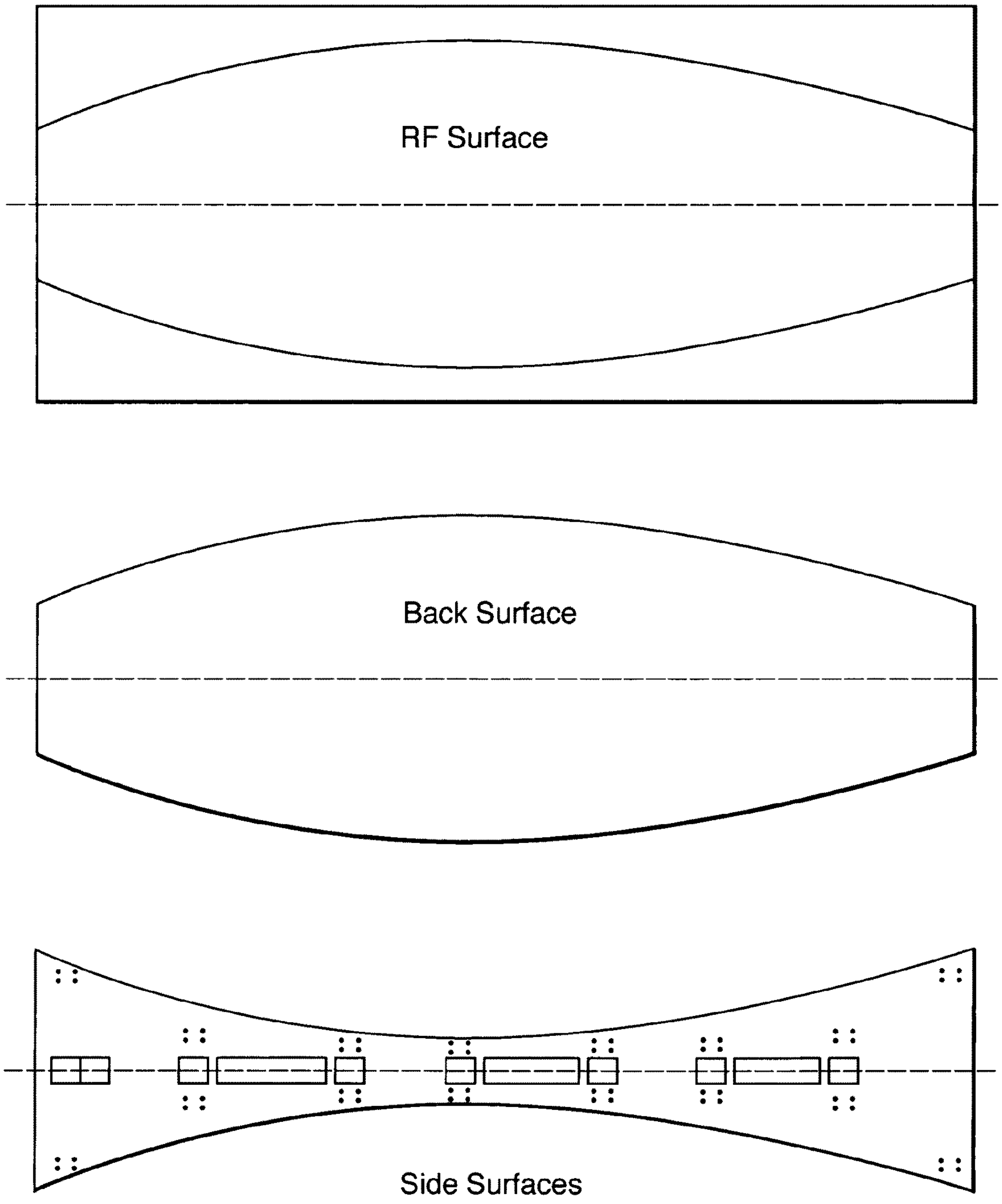
FIG. 5 is a view of a cutting pattern for a preferred structure embodying the present invention.

The various connections between different sheets of the antenna structure 10' can be conveniently made with, for example, flexible tape. The folds within a particular sheet are contemplated to be elastic flexures along the required fold lines, or they could be made by cutting the sheet into two parts and by connecting these parts together with flexible tape. Advantageously, tape springs can be used to hold the sheets flat in the deployed configuration. In this regard, FIG. 5 shows a schematic view of the typical cutting pattern and layout of tape-spring connections for a support structure of the kind shown in FIG. 4.

Figure 6:
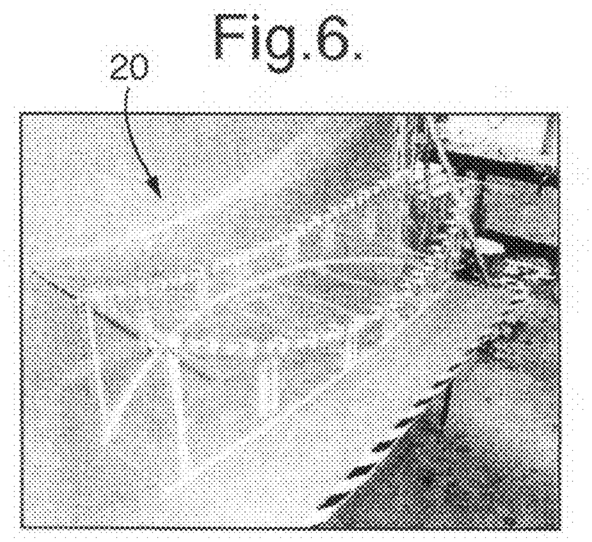
FIG. 6 shows a model structure of a hollow-solid antenna structure embodying the present invention when in deployed condition.

In FIG. 6, there is shown a model structure realisation of a preferred hollow-solid antenna structure 20 embodying the present invention when in deployed condition. Note that this structure 20 has a well-defined, interconnecting curved surface configuration similar to that described in the FIG. 3(*b*) embodiment. Note also that this structure 20 relies upon the two-stage deployment mechanism as explained above.

Figure 7:
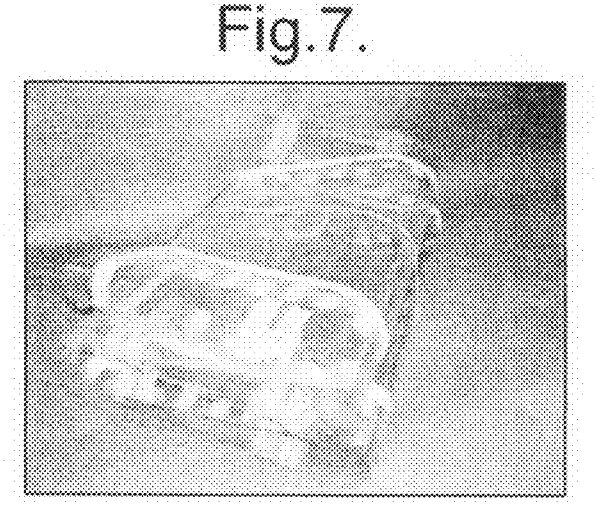
FIGS. 7 and 8 show two different ways in which the structure of FIG. 6 is packaged, FIG. 7 showing the structure in Z-folded condition and FIG. 8 showing the structure in coiled condition.
Figure 8:
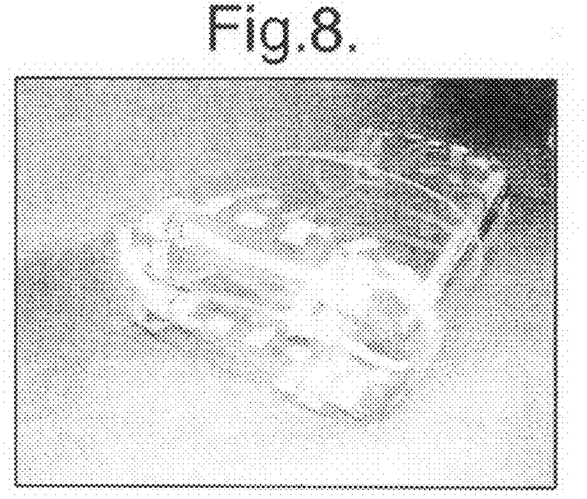

In FIGS. 7 and 8, there are shown by way of example two different model structure realisations of the antenna structure of FIG. 6 when in folded condition. FIG. 7 shows a first way in which the structure is effectively folded/packaged to form a well-defined, Z-folded type configuration. FIG. 8 shows a second way in which the structure is effectively folded/packaged to form a well-defined, coiled configuration. The various advantages and disadvantages associated with such types of folding have been explained above in relation to FIGS. 2(*a*), (*b*).

Figure 9:
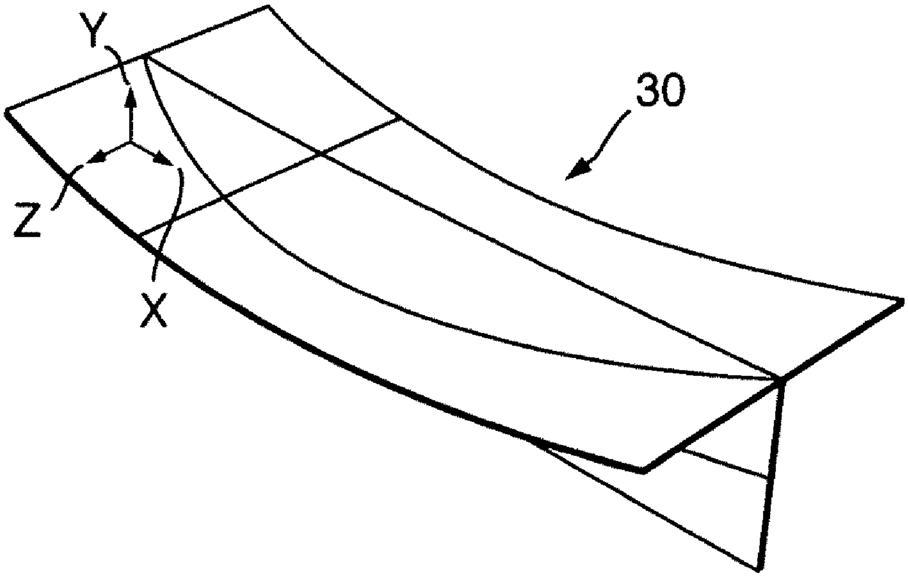
FIG. 9 is a schematic view of another antenna structure embodying the present invention.

In FIG. 9, there is schematically shown therein another preferred antenna structure 30 embodying the invention when in deployed condition. As shown in the Figure, the structure 30 has a well-defined, interconnecting curved surface configuration in which the curved edges of two sheets are made to meet at two end points. As a result, a hollow solid is formed in deployed condition which is bounded by two lines (as formed by the edges of two sheets) instead of two rectangles. Note also that the described structure relies upon the two-stage deployment mechanism as explained above.

Figure 10:
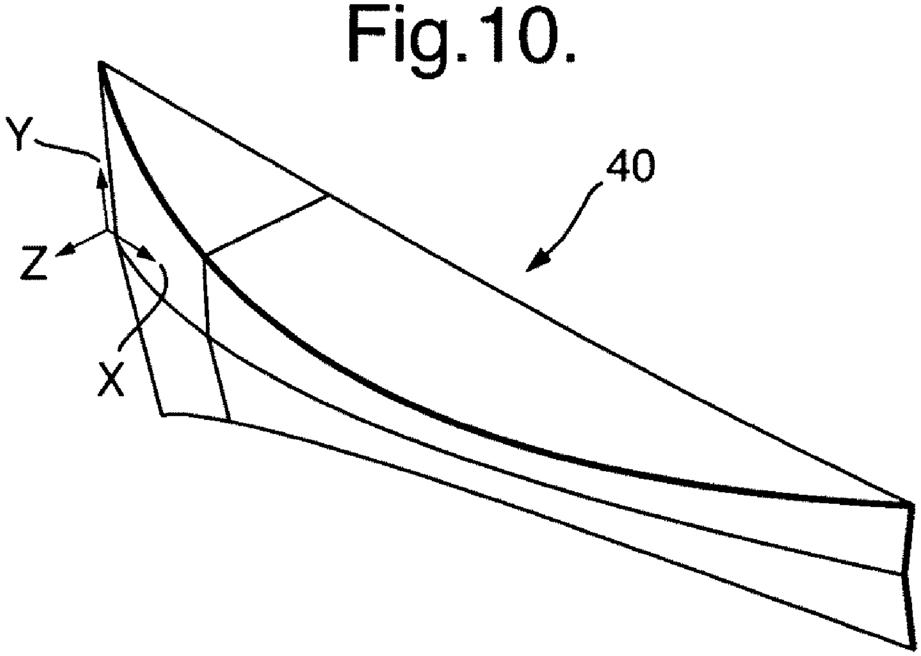
FIG. 10 is a schematic view of a tapered hollow solid antenna structure embodying the present invention.

In FIG. 10, there is schematically shown therein a tapered hollow solid antenna structure 40 embodying the invention when in deployed condition. As shown in the Figure, the structure has a well-defined, interconnecting curved surface configuration which is different from the above described FIG. 6 antenna structure in that the resultant hollow solid structure is tapered (as opposed to being untapered).

Figure 11:
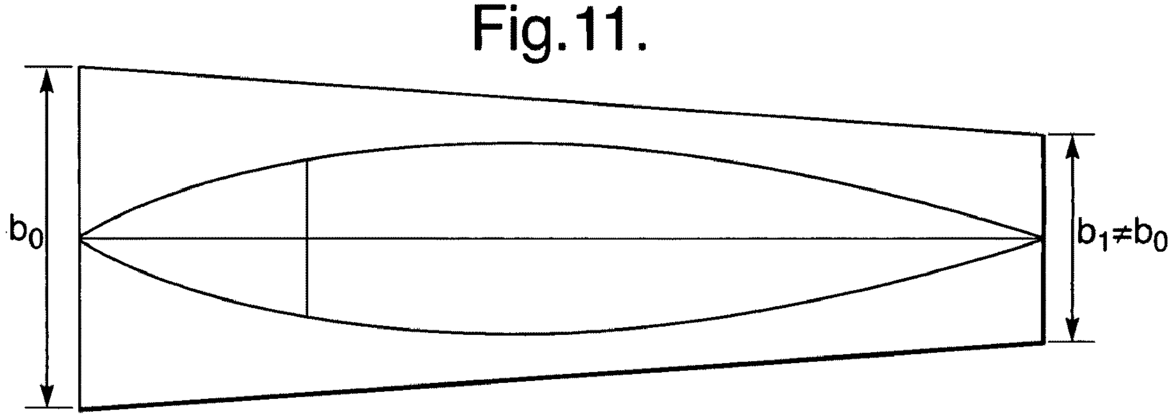
FIG. 11 is a view of a cutting pattern for the structure of FIG. 10.

FIG. 11 shows the corresponding cutting pattern for the FIG. 10 tapered structure.

Figure 12A:
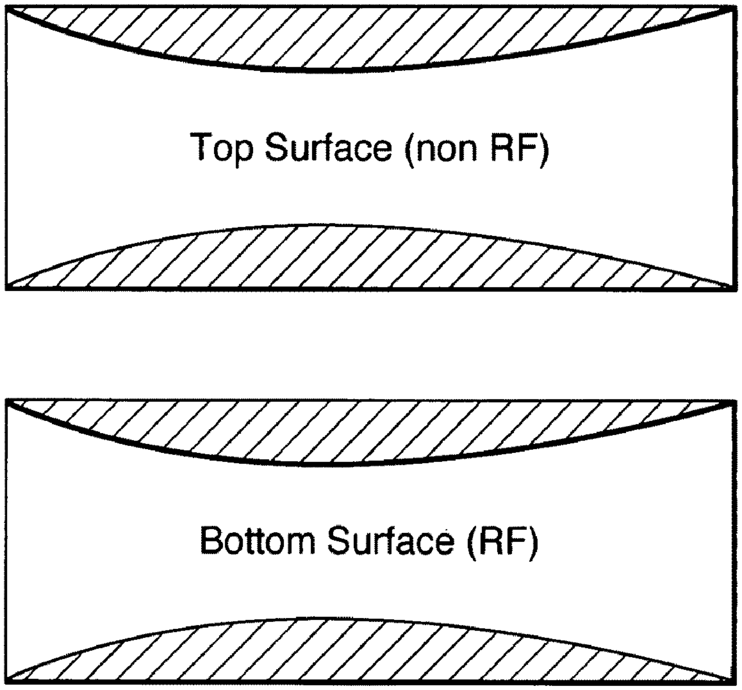
FIG. 12 is a schematic view of another antenna structure embodying the present invention.
Figure 12B:
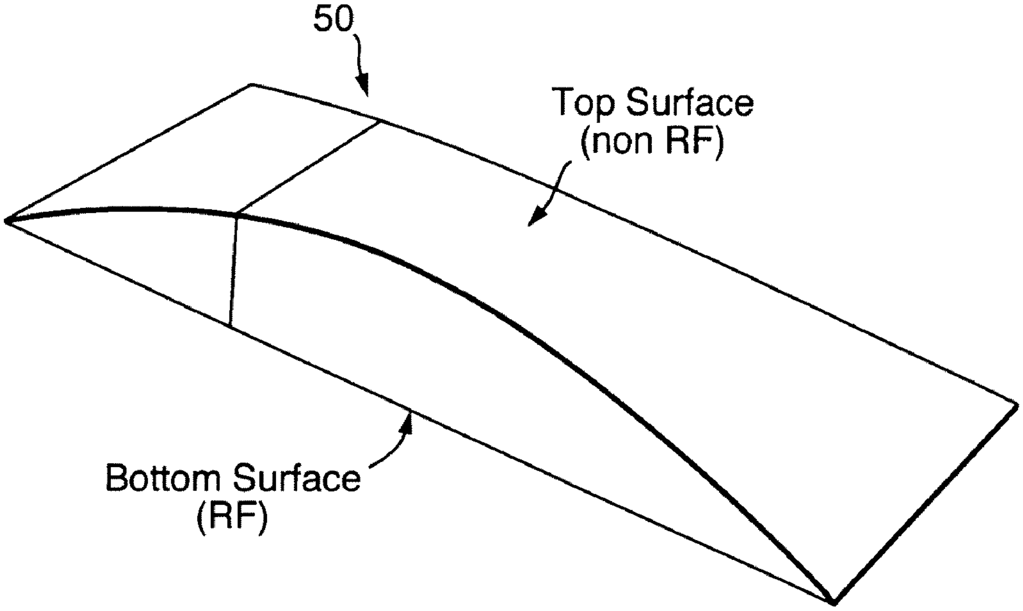

FIG. 12 shows another hollow solid antenna structure 50 embodying the present invention when in deployed condition. As shown, the structure 50 has four interconnecting surfaces which together form a well-defined hollow solid and the marked bottom surface (as opposed to the top surface) is deployed as a reflective (RF) surface. This structure 50 relies upon the two stage deployment mechanism as explained above.

Figure 13:
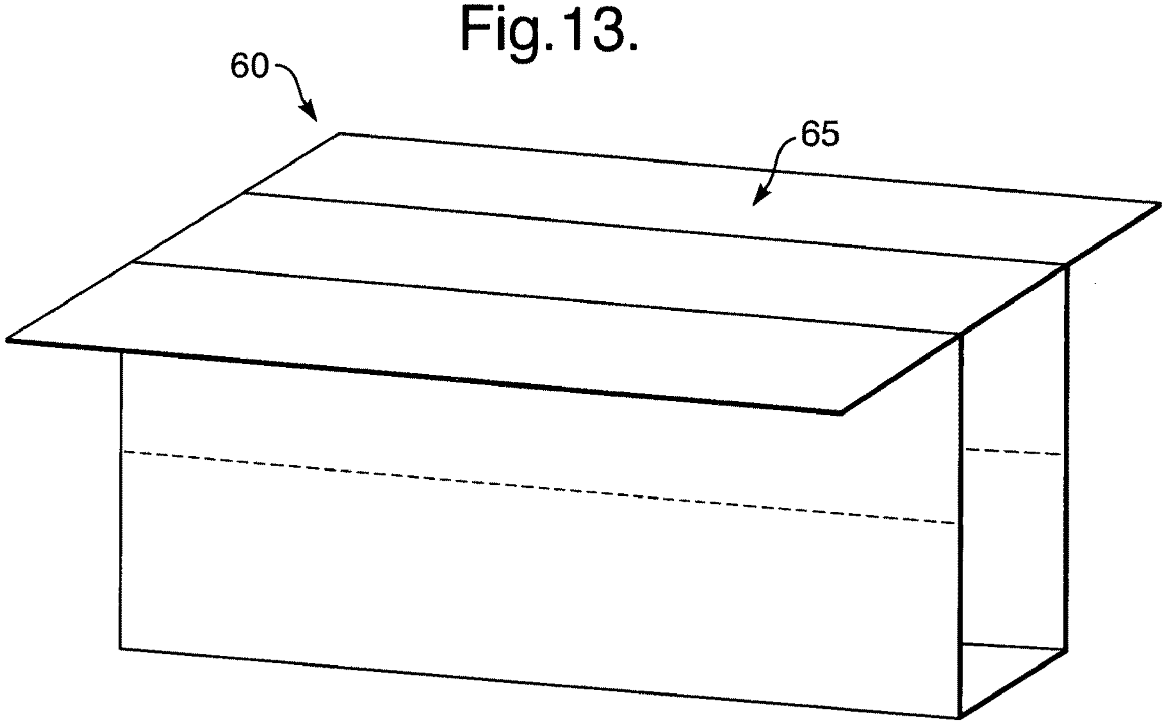
FIG. 13 shows a preferred structure of the invention when deployed for absorbing applications.

FIG. 13 shows another structure 60 embodying the invention when in deployed condition. As shown, the structure 60 has a thin-walled box type cross-section comprising four interconnecting surfaces made of sheet material (carbon composite material for example) with straight edges, and a flat absorbing surface 65 attached to the top surface of the structure. Thus, the structure 60 is similar to that described in relation to FIG. 4 except that it makes use of sheets with straight edges and that it deploys an absorbing surface (as opposed to a reflective surface). Conveniently, the structure 60 can be effectively deployed in solar array type applications.

Referring now to FIGS. 14 to 17, the geometric definition of the hollow-solid support structure of FIG. 3 is explained in further detail.

Figure 14A:
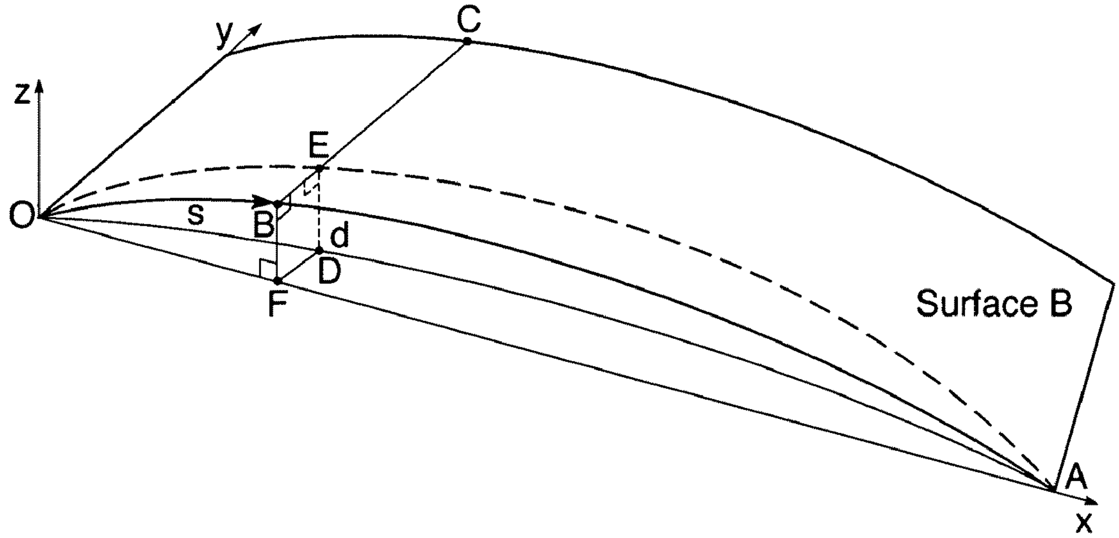
FIGS. 14 to 17 provide an explanation of the geometric definition of the structure of FIG. 3, FIG. 14 showing two configurations of a singly-curved surface, FIG. 15 showing a required edge profile of sheet A to shape a singly-curved surface in (a) deployed configuration and (b) folded configuration, FIG. 16 showing an RF surface profile (all dimensions in mm) and FIG. 17 showing a top view of a flattened support structure (assuming a tapered design $b_0 \neq b_1$).
Figure 14B:
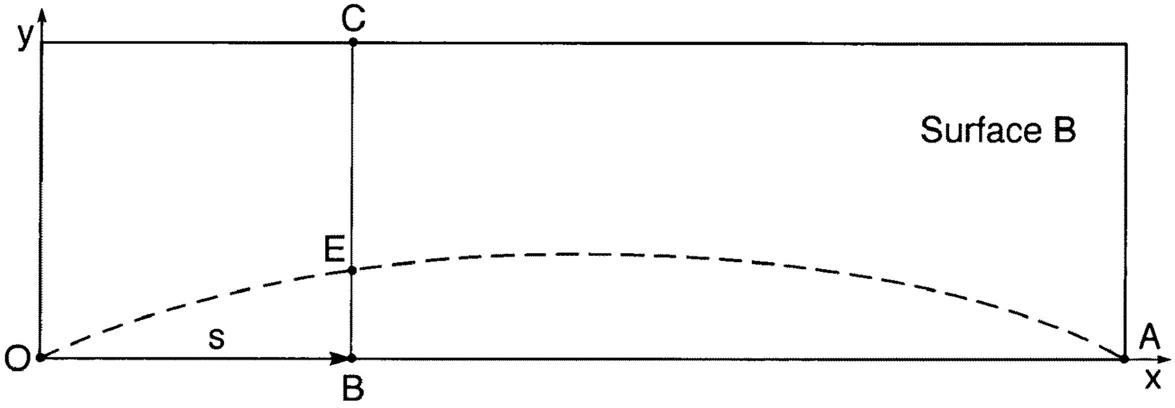

FIG. 14(*a*) shows a cylindrical surface (corresponding to sheet B in the earlier FIG. 3 explanation). It is to be appreciated that the edge profile of sheet A is determined by considering the required shape of sheet B. This surface can be generated by considering the two-dimensional curve z=f(x) and by translating this curve along a generator segment which is parallel to the y-axis, for example BC.

Note that in FIG. 14(*a*) a general point on z=f (x) is point B; also note that the x-axis starts at the origin 0, and passes through the end point A of the curve. Finally, note that all points on BC have the same arc-length distance s from O, and the same distance d from the xy plane.

Let F and D be the projections of B and E onto the xy plane, so that clearly $$\overline{BF}=\overline{DE}=d$$

Now consider flattening the surface onto the xy-plane while keeping its edge fixed along the y-axis. During this process BC moves in the x and z directions, while remaining parallel to the y-axis. The height d of E above the xy-plane becomes zero.

Figure 15A:
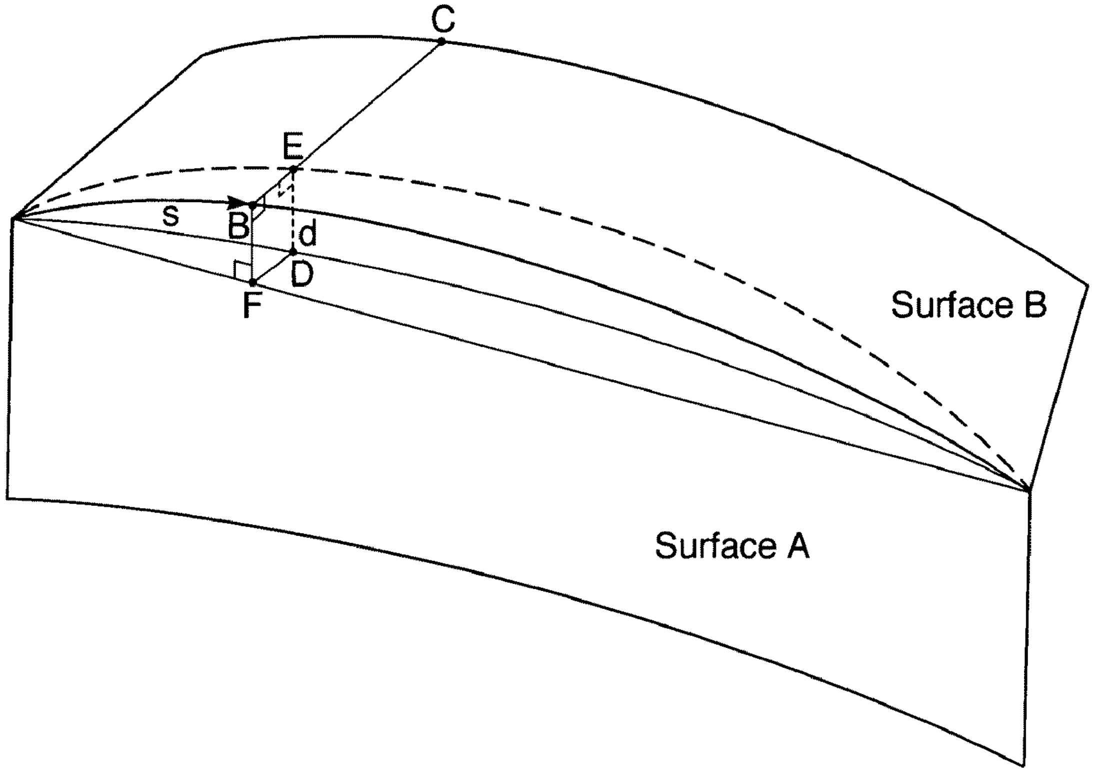
Figure 15B:
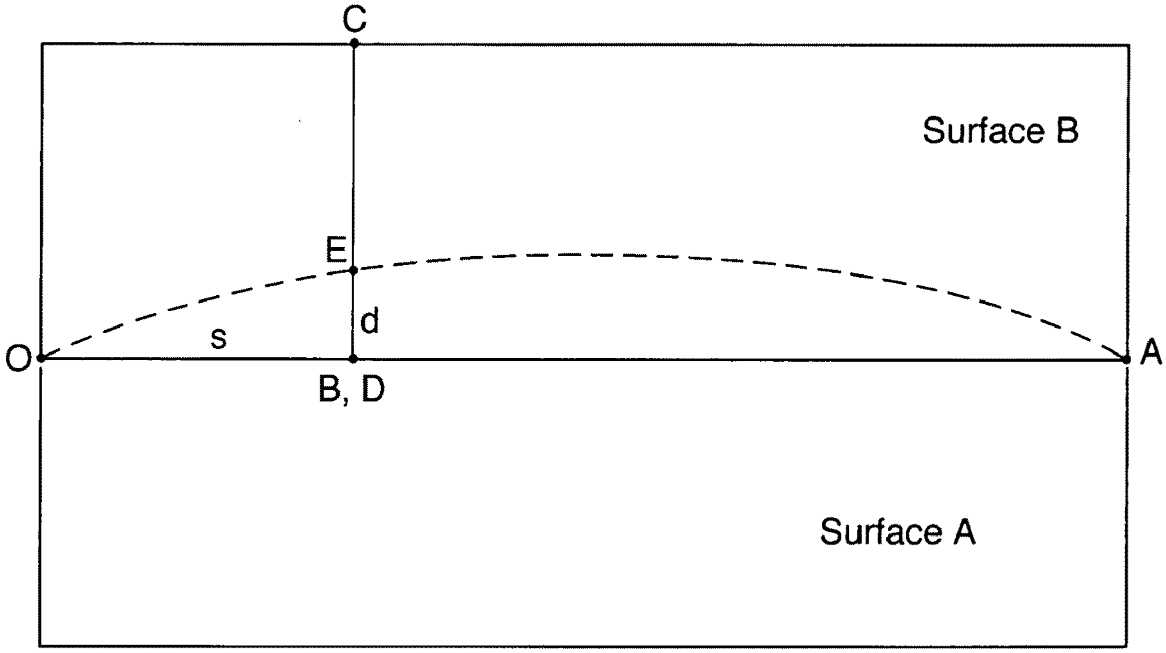

Next, consider attaching the curved surface B to another curved surface A, as shown in FIG. 15(*a*). It is required that the surface B has a particular curved shape, defined by f (x) as above, and that the two surfaces can be flattened together.

One will now look for the locus of the points E on the surface B defining the curved profile of surface A, and hence the curve along which the two surfaces are attached. It will be assumed that the generator BC is perpendicular to the surface A in the curved configuration (i.e. the deployed configuration), although a more general situation could be considered. It will also be assumed that the two surfaces are tied to each other at the general point E and there is no relative motion of the tie points during flattening or deployment.

The following conditions apply

Condition 1: The arc-length of E, measured on the surface B, is equal to the arc-length of OE measured on the surface A. This condition needs to be satisfied in the two extreme configurations shown in FIG. 15, and also in any intermediate configuration (but intermediate configurations will not be considered here).

Condition 2: When the surfaces are flattened, both points B and D move towards point F, and so B and D coincide when the surfaces are flattened, see FIG. 15(*b*). Hence, it follows that $$\overline{BE}=\overline{DE}=d \tag{1.1}$$

The above conditions define the required edge profile of surface A. This profile is defined by s(x) and d(x). Given a two-dimensional curve z=f(x), s(x) will be the are length along this curve, and d(x)=z.

Note that, from Equation 1.1 above, both sheets have the same singly-curved shape in the deployed configuration.

Cutting Pattern

For ease of manufacture, the whole structure is to be made from flat sheets. The concave and convex surfaces will be obtained by bending these sheets.

Figure 16:
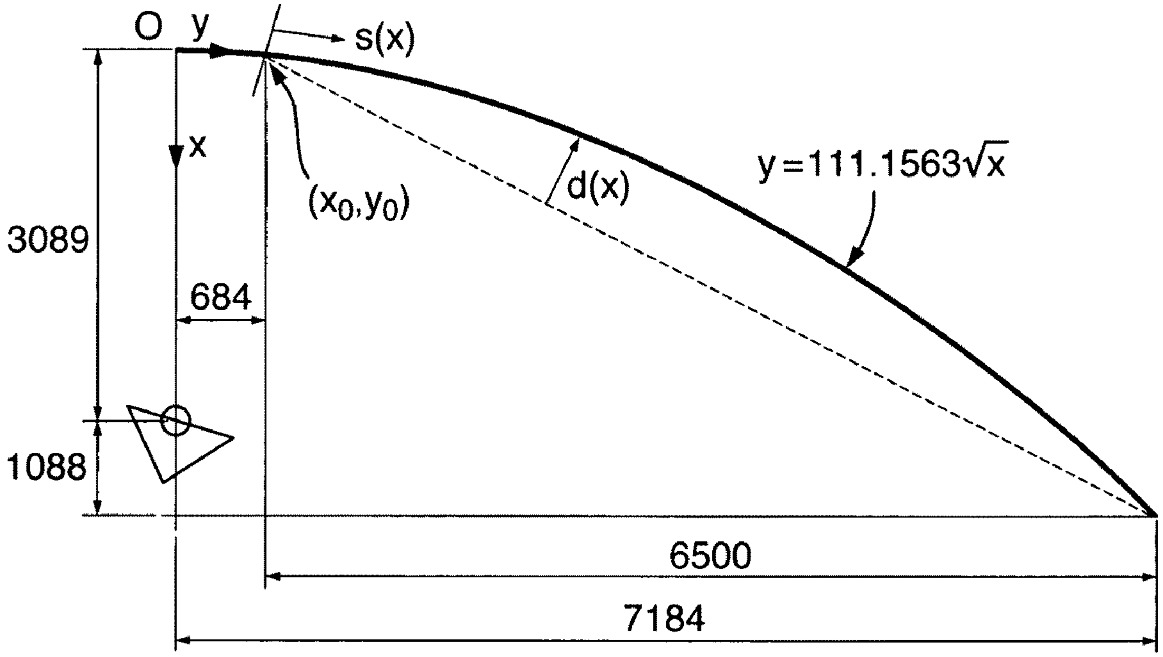
Figure 17:
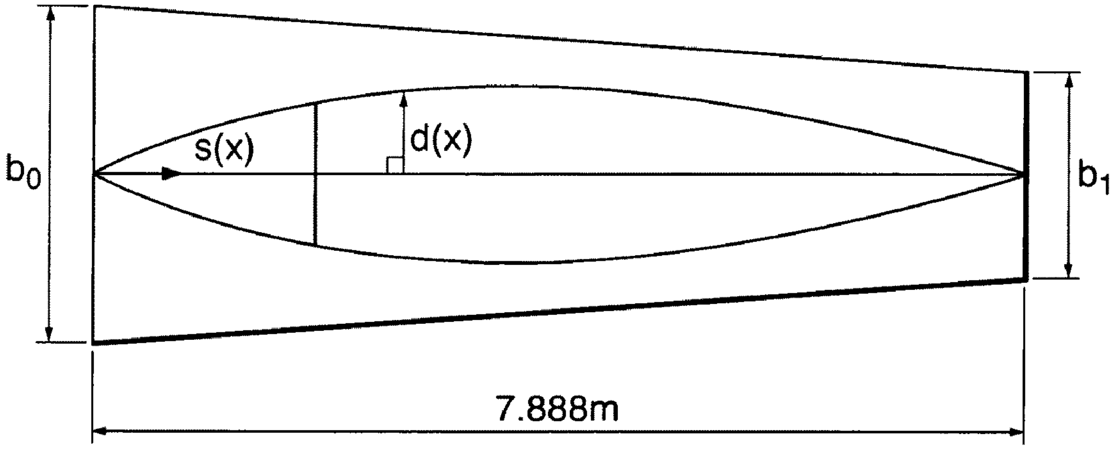

The required parabolic profile for the reflective surface is shown in FIG. 16. Following the above explanation, the cutting pattern for the flat sheets requires that the are length s (x) and the perpendicular distance from the chord line to the parabola d (x) be worked out. These two functions are unchanged in the case of a tapered support structure, hence this more general case has been shown in FIG. 17.

The equation of a parabola with vertex at (0, 0) is given by $$y^2=4ax \tag{1.2}$$

where a is the focal distance. Equation 1.2 can be rewritten as $$y=k\sqrt{x} \tag{1.3}$$

where $k=2\sqrt{a}$. The are length from the offset point $(x_0,y_0)$ to a generic point (x,y) on the parabola is calculated from $$s(x)=\int_{x0}^{x}\sqrt{1+(dy/dx)^2dx} \tag{1.4}$$

Substituting Equation 1.3 into Equation 1.4 and carrying out the integration yields $$s(x)=\frac{1}{2}\sqrt{x(4x+k^2)}-\frac{1}{2}\sqrt{x_0(4x_0+k^2)}-\frac{k^2}{8}\text{Ln}\left(\frac{8x+k^2+4\sqrt{x(4x+k^2)}}{8x_0+k^2+4\sqrt{x_0(4x_0+k^2)}}\right) \tag{1.5}$$

Substituting the end point of the parabola ($x_f$=4177 mm,$y_f$=7184 mm) into Equation 1.3 yields k=111.2 $mm^{1/2}$ corresponding to a focal length a=3089 mm. This gives the co-ordinates of the starting point for the reflective surface as $x_0$=38 mm at $y_0$=684 mm. Substituting $x_0$ and k into Equation 1.5 yields $$s(x)=\frac{1}{2}\sqrt{x(4x+12355)}-344+1544\mathrm{Ln}\left(519\times 10^{-6}x+0.8017+260\times 10^{-6}\sqrt{x(4x+12356)}\right) \tag{1.6}$$

The equation of the chord line of the reflector, which joins the start and end points of the reflective surface, is written as $$y_c=a_0+a_1x \tag{1.7}$$

where $a_0=(y_0x_f-x_0y_f)/(x_f-x_0)=624$ mm, and $a_1=(y_f-y_0)/(x_f-x_0)=1.57$ mm/mm.

Consider a generic point on the parabola, A (x,y), and a point on the chord line, B ($x_c$,$y_c$).

The distance between A and B is $$d_{AB}=\sqrt{(x-x_c)^2+(y-y_c)^2} \tag{1.8}$$

Substituting $y=k\sqrt{x}$ and $y_c=a_0+a_1x_c$ into Equation 1.8 we obtain $$d_{AB}=\sqrt{(x-x_c)^2+(k\sqrt{x}-a_0-a_1x_c)^2} \tag{1.9}$$

The shortest distance d(x) between y(x) and the chord line can be obtained my minimising $d_{AB}$. Hence we set the first derivative of $d_{AB}$ with respect to $x_c$ equal to zero and solve for $x_c$.

$$\frac{\partial d_{AB}}{\partial x_c}=0 \tag{1.10}$$

$$x_c=\frac{(x+a_1k\sqrt{x}-a_0a_1}{(1+a_1^2)} \tag{1.11}$$

The shortest distance d(x) is obtained by substituting Equation 1.11 into is Equation 1.9.

$$d(x)=\sqrt{\frac{(xa_1+a_0-k\sqrt{x})^2}{1+a_1^2}} \tag{1.12}$$

Finally, substituting numeral values for k,$a_0$, and $a_1$ into Equation 1.12 yields $$d(x)=0.5371\sqrt{(1.570x-111.1\sqrt{x}+624.5)^2} \tag{1.13}$$

Having thus described the present invention by reference to various preferred embodiments, it is to be appreciated that the embodiments are in all respects exemplary and that modifications and variations are possible without departure from the spirit and scope of the invention. For example, the surfaces of the inventive structure may have varying degrees of curvature, varying shapes and sizes, and the number of surfaces and connecting hinge lines associated therewith may also be easily varied to provide the same inventive technical effect, the minimum requirement being that there are two surfaces and one connecting hinge line in the structure.

Furthermore, it is to be appreciated that the inventive structure has utility in various space-based applications as well as in ground-based applications; for example, the structure could be deployed in reflecting applications as well as in absorbing (solar array type) applications. The structure could also be possibly used for MEMS fabrication-type applications provided that the surfaces of the structure are suitably formed of thin (micro-size thickness) sheet material.

The invention claimed is:

1. A two-stage deployable antenna support structure comprising:

a plurality of interconnected surfaces;

means defining at least one curved hinge line along which said surfaces are interconnected;

said surfaces being adapted and arranged to provide a package of predetermined shape and size;

said package being deployable by means of a first unfolding operation of the surfaces to form a substantially flat structure; and said substantially flat structure being further deployable by means of a second unfolding operation of the surfaces to form a well-defined structure.

2. A two-stage deployable support structure comprising:

four interconnected surfaces;

means defining four curved hinge lines along which said surfaces are interconnected;

said surfaces being movable between a first stowed position, in which the surfaces provide a package of predetermined shape and size, and a first deployed position in which two of the surfaces are folded along their respective center lines such that the four surfaces form a substantially flat structure; and said surfaces being further movable between said first deployed position and a second deployed position in which two of said surfaces are concave-shaped opposing surfaces and the other two surfaces are convex-shaped opposing surfaces, the four surfaces forming a well defined structure.

3. A deployable antenna support structure as claimed in claim 1 wherein there are only two surfaces interconnected at a single curved hinge line.

4. A deployable antenna support structure as claimed in claim 1 wherein there are four surfaces linked in a closed configuration and four curved hinge lines associated therewith, wherein in the first deployed position two of the surfaces are folded along their respective center lines and in the second deployed position two of the surfaces are concave-shaped opposing surfaces and the other two surfaces are convex-shaped opposing surfaces.

5. A deployable antenna support structure as claimed in claim 1 wherein one of the surfaces is configured to provide a reflective surface.

6. A deployable antenna support structure as claimed in claim 5 wherein said reflective surface has a parabolic shape.

7. A deployable antenna support structure as claimed in claim 1 wherein said package has a folded Z shape in stowed condition.

8. A deployable antenna support structure as claimed in claim 1 wherein said package has a coil shape in stowed condition.

9. A deployable antenna support structure as claimed in claim 1 further comprising hinge power means for application on the number of hinge lines for powering the two-stage deployment of the structure.

10. A deployable antenna support structure as claimed in claim 9 wherein said hinge power means is provided by a number of tape-spring hinges selectively added to the walls of the structure.

11. A deployable antenna support structure as claimed in claim 1 further comprising locking means for latching the structure in deployed position.

12. A deployable antenna support structure as claimed in claim 1 wherein the structure is formed of lightweight composite material.

13. A deployable antenna support structure as claimed in claim 12 wherein the lightweight composite material comprises carbon-fibre composite material.

14. A deployable antenna support structure as claimed in claim 1 wherein the surfaces are formed of thin sheet material of micron-size thickness.

15. A reflector system for space-based applications incorporating a deployable antenna support structure as claimed in claim 1.

16. A spacecraft incorporating a reflector system as claimed in claim 15.

17. A synthetic aperture radar (SAR) satellite incorporating a reflector system as claimed in claim 15.

18. A method of deploying an antenna support structure in two stages comprising the steps of:

(a) providing a package of predetermined shape and size in stowed condition, which package comprises a plurality of interconnected surfaces with means defining a number of curved hinge lines along which the surfaces are interconnected;

(b) unfolding the surfaces of the package so as to form a substantially flat structure for first stage deployment; and (c) unfolding the surfaces of the substantially flat structure about the curved hinge lines so as to form a well-defined structure for second stage deployment.

19. A deployable antenna support structure as claimed in claim 1 wherein one of the surfaces is configured to provide an absorbing surface.

* * * * *